(12) United States Patent
Rothfuss et al.

(10) Patent No.: US 9,757,880 B2
(45) Date of Patent: Sep. 12, 2017

(54) SPATIAL HEAT TREATMENT OF ADDITIVELY MANUFACTURED OBJECTS

(71) Applicant: Empire Technology Development LLC, Wilmington, DE (US)

(72) Inventors: Christopher J. Rothfuss, Laramie, WY (US); Vincenzo Casasanta, III, Woodinville, WA (US); Michael Keoni Manion, Seattle, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 117 days.

(21) Appl. No.: 14/596,078

(22) Filed: Jan. 13, 2015

(65) Prior Publication Data

US 2016/0200011 A1     Jul. 14, 2016

(51) Int. Cl.
  *B29C 35/12*     (2006.01)
  *B29C 67/00*     (2017.01)
  (Continued)

(52) U.S. Cl.
  CPC .......... *B29C 35/12* (2013.01); *B29C 35/0272* (2013.01); *B29C 35/0805* (2013.01); *B29C 65/04* (2013.01); *B29C 65/1429* (2013.01); *B29C 67/0081* (2013.01); *B32B 5/142* (2013.01); *B32B 27/08* (2013.01); *B32B 27/16* (2013.01); *B32B 27/18* (2013.01); *B32B 27/26* (2013.01); *B32B 27/286* (2013.01); *B32B 27/302* (2013.01); *B32B 27/308* (2013.01); *B32B 27/34* (2013.01); *B32B 27/365* (2013.01); *C04B 28/02* (2013.01); *C04B 35/64* (2013.01);
  (Continued)

(58) Field of Classification Search
  None
  See application file for complete search history.

(56) References Cited

U.S. PATENT DOCUMENTS 4,140,645 A * 2/1979 Beall ............... H01F 1/37
                                        252/62.59
4,182,641 A * 1/1980 Fitts ................ B29C 67/20
                                        156/155

(Continued)

FOREIGN PATENT DOCUMENTS

WO       2014/058437       4/2014

OTHER PUBLICATIONS

Namiki et al. "3D Printing of Continuous Fiber Reinforced Plastic" Proc. Soc. Adv. Mat. Proc. Eng. 2014, 6 pages.*

(Continued)

*Primary Examiner* — Robert S Loewe
(74) *Attorney, Agent, or Firm* — Dorsey & Whitney LLP

(57) ABSTRACT

A matrix material dispersed with one or more susceptor structures can be formed into a feedstock for an additive manufacturing process. The one or more susceptor structures can be excited by an energy field such as an electric field, a magnetic field, an electromagnetic field, or any combination thereof, to produce heat. The heat that is produced can be transferred to the matrix material that surrounds the one or more susceptor structures to provide heat treatment to the matrix material. The heat treatment can improve the material and mechanical properties of three dimensional objects formed from the feedstock.

16 Claims, 2 Drawing Sheets

(51) Int. Cl.

| | |
|---|---|
| B29C 65/04 | (2006.01) |
| B29C 65/14 | (2006.01) |
| B29C 35/08 | (2006.01) |
| B32B 27/08 | (2006.01) |
| B32B 27/36 | (2006.01) |
| B32B 27/34 | (2006.01) |
| B32B 27/30 | (2006.01) |
| B32B 27/28 | (2006.01) |
| C08K 3/00 | (2006.01) |
| C08K 3/04 | (2006.01) |
| C08K 3/08 | (2006.01) |
| C08K 3/22 | (2006.01) |
| C08K 5/00 | (2006.01) |
| C08K 5/14 | (2006.01) |
| B29C 35/02 | (2006.01) |
| C04B 35/64 | (2006.01) |
| C04B 28/02 | (2006.01) |
| C04B 40/02 | (2006.01) |
| B32B 5/14 | (2006.01) |
| B32B 27/16 | (2006.01) |
| B32B 27/18 | (2006.01) |
| B32B 27/26 | (2006.01) |
| B29K 101/12 | (2006.01) |
| B29K 101/10 | (2006.01) |
| B29K 105/16 | (2006.01) |
| B33Y 70/00 | (2015.01) |
| B33Y 10/00 | (2015.01) |
| B33Y 40/00 | (2015.01) |
| B33Y 80/00 | (2015.01) |

(52) U.S. Cl.
CPC ...... *C04B 40/0209* (2013.01); *C04B 40/0263* (2013.01); *C08K 3/0008* (2013.01); *C08K 3/0016* (2013.01); *C08K 3/04* (2013.01); *C08K 3/08* (2013.01); *C08K 3/22* (2013.01); *C08K 5/0025* (2013.01); *C08K 5/14* (2013.01); *B29C 2035/0811* (2013.01); *B29K 2101/10* (2013.01); *B29K 2101/12* (2013.01); *B29K 2105/16* (2013.01); *B29K 2995/0003* (2013.01); *B29K 2995/0008* (2013.01); *B32B 2307/31* (2013.01); *B33Y 10/00* (2014.12); *B33Y 40/00* (2014.12); *B33Y 70/00* (2014.12); *B33Y 80/00* (2014.12); *C04B 2235/3239* (2013.01); *C04B 2235/3272* (2013.01); *C04B 2235/3284* (2013.01); *C04B 2235/3296* (2013.01); *C04B 2235/3826* (2013.01); *C04B 2235/425* (2013.01); *C04B 2235/444* (2013.01); *C04B 2235/446* (2013.01); *C04B 2235/5436* (2013.01); *C04B 2235/5445* (2013.01); *C04B 2235/5454* (2013.01); *C04B 2235/6026* (2013.01); *C04B 2235/667* (2013.01); *C08K 2003/0831* (2013.01); *C08K 2003/2272* (2013.01)

(56) References Cited

U.S. PATENT DOCUMENTS

| | | | | |
|---|---|---|---|---|
| 6,934,600 | B2* | 8/2005 | Jang | B82Y 30/00 |
| | | | | 264/109 |
| 7,795,349 | B2* | 9/2010 | Bredt | B29C 67/0081 |
| | | | | 156/284 |
| 8,097,336 | B2 | 1/2012 | Owens | |
| 8,378,877 | B2 | 2/2013 | Tishin et al. | |
| 2004/0159654 | A1 | 8/2004 | Ryan et al. | |
| 2005/0203225 | A1* | 9/2005 | Nakagawa | B29C 66/73752 |
| | | | | 524/190 |
| 2005/0208361 | A1* | 9/2005 | Enjoji | B29C 65/1635 |
| | | | | 429/483 |
| 2005/0282029 | A1 | 12/2005 | Keipert et al. | |
| 2008/0116426 | A1* | 5/2008 | Adachi | B29C 66/73117 |
| | | | | 252/582 |
| 2009/0136717 | A1* | 5/2009 | Kihara | B29C 53/40 |
| | | | | 428/174 |
| 2010/0122642 | A1* | 5/2010 | Farrugia | C09D 11/101 |
| | | | | 106/31.29 |
| 2012/0196453 | A1 | 8/2012 | Alford | |
| 2013/0303729 | A1 | 11/2013 | Basile | |
| 2014/0050921 | A1* | 2/2014 | Lyons | B29C 67/0051 |
| | | | | 428/372 |
| 2015/0080495 | A1* | 3/2015 | Heikkila | B29C 67/0055 |
| | | | | 523/223 |

OTHER PUBLICATIONS

Chiolerio et al. "Magnetic properties of acrylic UV-cured films containing magnetite nanoparticles" Mater. Res. Soc. Symp. Proc. vol. 1312, 2011, 293-299.*

Mohr et al. "Initiation of shape-memory effect by inductive heating of magnetic nanoparticles in thermoplastic polymers" PNAS, 103(10), 2006, 3540-3545.*

Ye et al. "Induction Curing of Thiol-Acrylate and Thiol-Ene Composite Systems" Macromolecules, 2011, 44, 4988-4996.*

Hubbard et al. "Curing of a Bisphenol E Based Cyanurate Ester Using Magnetic Nanoparticles as an Internal Heat Source through Induction Heating" ACS Appl. Mater. Interfaces 2013, 5, 11329-11335.*

Callister, W. D. and Rethwisch, D. G., "Materials Science and Engineering: An Introduction," 8th ed., John Wiley & Sons, Inc., pp. 992 (2010).

Gibson, I. et al., "Additive Manufacturing Technologies: Rapid Prototyping to Direct Digital Manufacturing," New York: Springer, pp. 462 (2010).

International Search Report and Written Opinon dated May 2, 2016 received in PCT/US2016/012368.

"Real Parts TM Mean Real Possibilities," 2012, Accessed at http://web.archive.org/web/20140619054018/http://proto3000.com/assets/uploads/PDFs/StratasysProductBrochures/FortusOverallSystemSpecSheet.pdf, Accessed on Jun. 19, 2014, pp. 4.

Aguilar-Garib, J. A., "Thermal Microwave Processing of Materials," in Advances in Induction and Microwave Heating of Mineral and Organic Materials, InTech, pp. 243-267 (2011).

Bayerl, T. et al., "The Heating of Polymer Composites by Electromagnetic Induction—a Review," Composites Part A: Appied Science and Manufacturing, vol. 57, Feb. 2014 pp. 27-40.

Calabro, J.D. et al., "Magnetically driven three-dimensional manipulation and inductive heating of magnetic-dispersion containing metal alloys," PNAS, vol. 107, No. 11, Mar. 16, 2010, pp. 4834-4839.

Chen, Y. et al., "A layerless additive manufacturing process based on CNC accumulation," Rapid Prototyping Journal, vol. 17, No. 3, pp. 218-227 (2011).

Greszta, D. et al., ""Living" radical polymerization. 1. Possibilities and limitations," Macromolecules, vol. 27, No. 3, pp. 638-644 (1994).

Guo, N. and Leu, M. C., "Additive manufacturing: Technology, applications and research needs," Frontiers of Mechanical Engineering, vol. 8, Issue 3, May 2013, pp. 215-243.

Gupta A. and Ogale, A. A., "Dual curing of carbon fiber reinforced photoresins for rapid prototyping," Polymer Composites, vol. 23, No. 6, pp. 1162-1170 (2002).

Hawes, E. A. et al., "Spectrally selective heating of nanosized particles by surface plasmon resonance," Journal of Quantitative Spectroscopy and Radiative Transfer, vol. 104, No. 2, pp. 199-207, (2007).

Hourston, D. J., "Degradation of Plastics and Polymers," in Shreir's Corrosion, Oxford, Elsevier, pp. 2369-2376 (2010).

(56) References Cited

OTHER PUBLICATIONS

Kumar, S. and Kruth, J. P., "Composites by rapid prototyping technology," Materials & Design, vol. 31, No. 2, pp. 850-856 (2010).
Li, J.-L. and Gu, M., "Gold-nanoparticle-enhanced cancer photothermal therapy," IEEE Journal of Selected Topics in Quantum Electronics, vol. 16, No. 4, pp. 989-996 (2010).
Rao, K. J. et al., "Synthesis of Inorganic Solids Using Microwaves," Chemistry of Materials, vol. 11, No. 4, pp. 882-895 (1999).
Rodriguez, J. F. et al., "Maximizing the Strength of Fused-Deposition ABS Plastic Parts," in 10th Solid Freeform Fabrication Symposium, Austin, Texas, pp. 335-342 (1999).
Stratasys, "FDM Thermoplastics," 2013. [Online]. Available: http://www.stratasys.com/materials/fdm. [Accessed Aug. 28, 2013].
Takuma, K. et al., "Cationic polymerization of epoxide with benzyl phosphonium salts as the latent thermal initiator," Macromolecules, vol. 26, No. 4, pp. 862-863 (1993).
Vaezi, M. et al., "A review on 3D micro-additive manufacturing technologies," The International Journal of Advanced Manufacturing Techology, vol. 67, No. 5-8, pp. 1721-1754 (2013).
Vaezi, M. et al., "Multiple material additive manufacturing—Part 1: a review," Virtual and Physical Prototyping, vol. 8, No. 1, pp. 19-50, (2013).

* cited by examiner

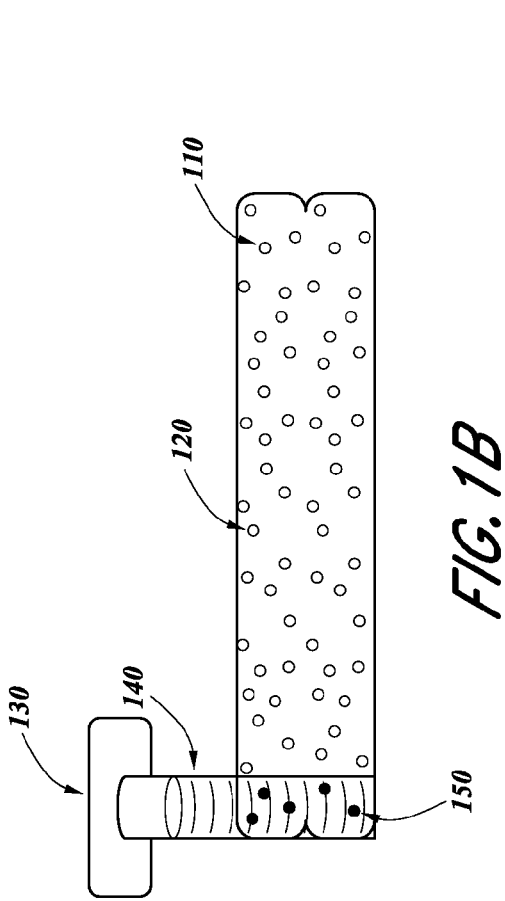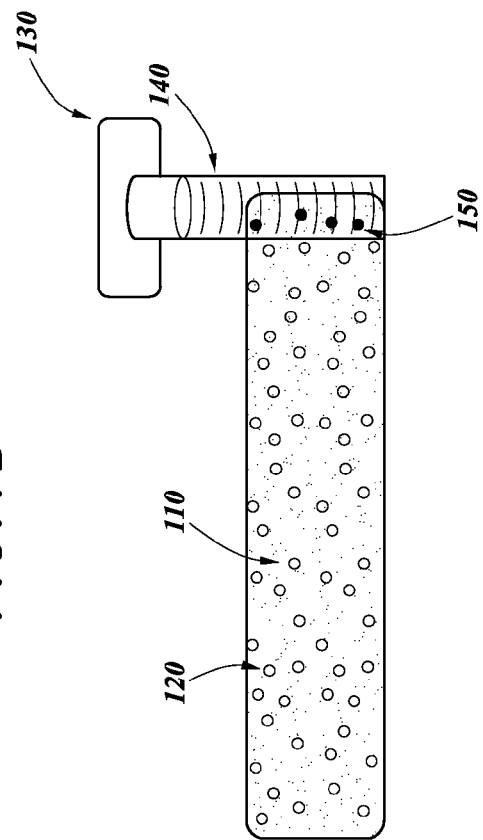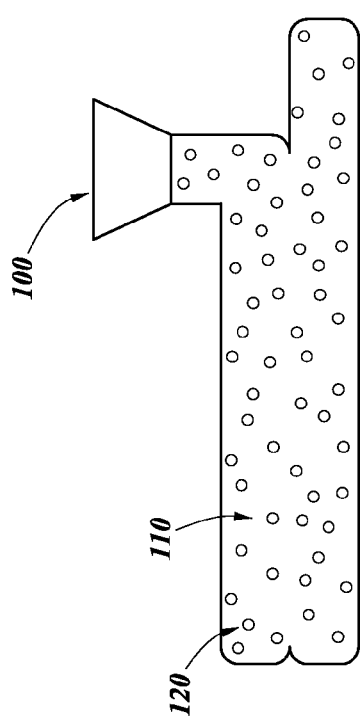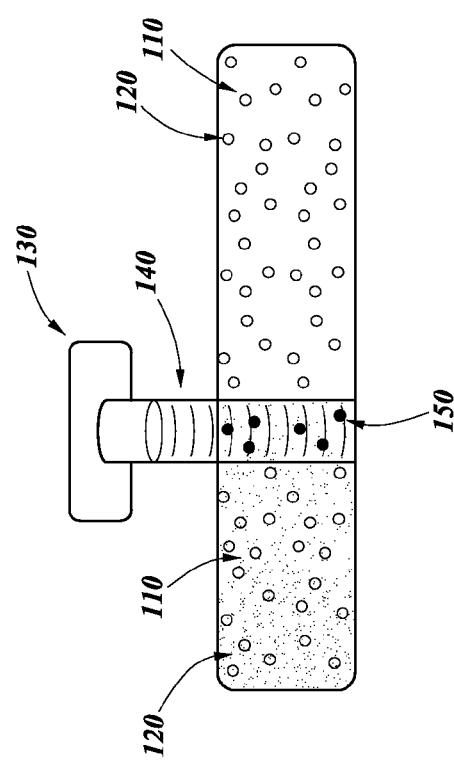

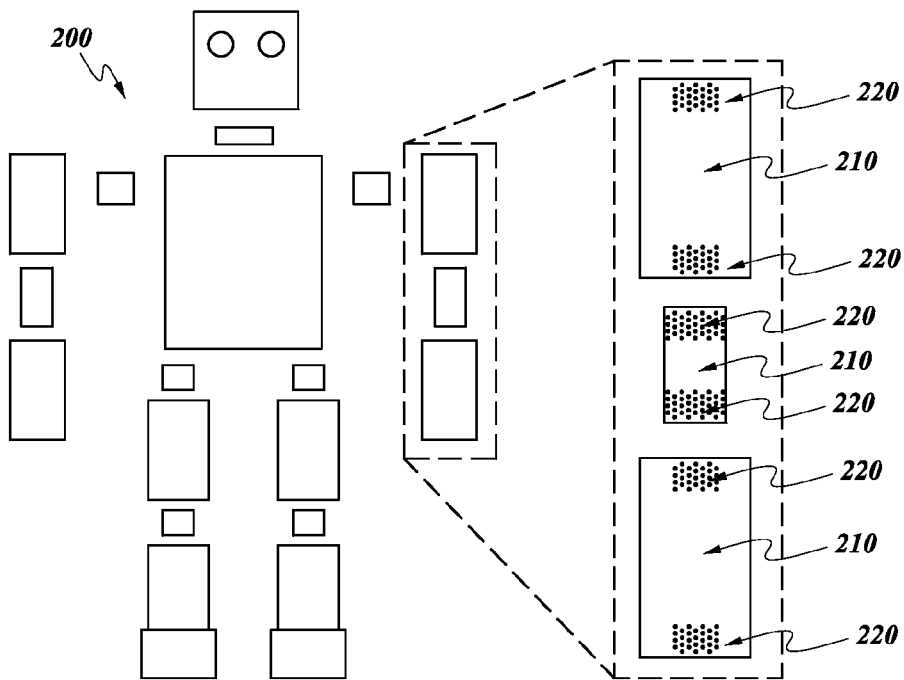
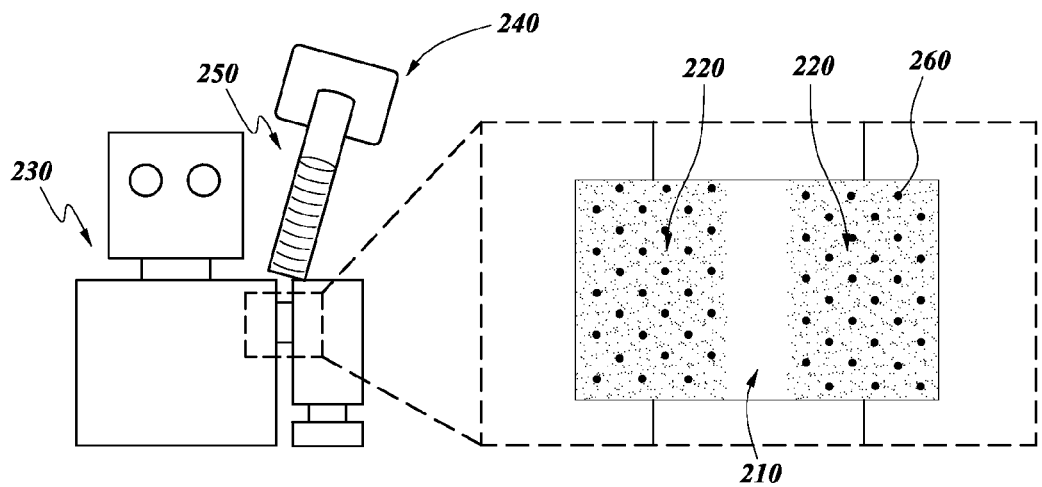

SPATIAL HEAT TREATMENT OF ADDITIVELY MANUFACTURED OBJECTS

BACKGROUND

Additive manufacturing (AM), also known as solid freeform manufacturing or rapid prototyping, is a class of manufacturing techniques in which successive material layers are stacked over one another to produce three-dimensional objects. Additive manufacturing boasts several advantages over conventional subtractive manufacturing, including the ability to create highly complicated geometric shapes, greatly improved material efficiency, and compatibility with a broad range of materials and applications. However, the layer-by-layer approach of most additive manufacturing processes has drawbacks, including relatively poor inter-layer bonding and induced anisotropy in the manufactured object. Considerable research and innovation have been directed towards compensating for these shortcomings, which has led to the development of several multiple-axis additive manufacturing processes and post-fabrication treatments for three-dimensional objects.

SUMMARY

A feedstock for additive manufacturing is disclosed. The feedstock comprises a matrix material, and one or more susceptor structures dispersed in the matrix material, wherein the one or more susceptor structures are configured to be excited when exposed to an energy field.

A method of making a three-dimensional object is also disclosed. The method comprises: providing a feedstock comprising a matrix material, and one or more susceptor structures dispersed in the matrix material; disposing the feedstock in one or more layers to form a three dimensional object; and exposing the three-dimensional object to an energy field to excite the one or more susceptor structures, wherein the one or more susceptor structures produce heat when excited by the energy field, and at least a portion of the heat transfers to at least a portion of the matrix material.

A method of thermally welding components is also disclosed. The method comprises: providing a first component comprising a first matrix material, and one or more first susceptor structures disposed in at least a first region of the first matrix material, wherein the one or more first susceptor structures are configured to be excited by an energy field; providing a second component comprising a second matrix material, the second matrix material having a second region; contacting the first region with the second region; and exposing at least the first region and the second region to the energy field to excite the one or more first susceptor structures in the first region, wherein the one or more first susceptor structures produce heat when excited by the energy field, and at least a portion of the heat transfers to at least a portion of the first matrix material to thermally weld the first component to the second component.

A three-dimensional object is also disclosed. The three-dimensional object comprises: a first component comprising a first matrix material and one or more first susceptor structures disposed in at least a first region of the matrix material, wherein the one or more first susceptor structures are configured to be excited by an energy field.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIGS. 1A to 1D show various stages in the process of making a three dimensional object in accordance with the present disclosure. FIG. 1A shows the deposition of layers of feedstock with susceptor structures dispersed throughout the matrix material, to form a three dimensional object. FIG. 1B shows exposure of a portion of the three dimensional object to an energy field produced by an energy field source. FIG. 1C shows exposure of additional areas of the three-dimensional object to the energy field. The darker areas to the left of the energy field source show areas of the matrix material that have been heat-treated with the heat produced by the susceptor structures after being excited by the energy field. FIG. 1D shows the three dimensional object after the exposure to the energy field is complete.

FIGS. 2A to 2C show a three dimensional object that has components to be assembled by thermal welding in accordance with the present disclosure. FIG. 2A shows unassembled components of the object. FIG. 2B shows an expanded view of a portion of FIG. 2A. The expanded view shows each component that has susceptor structures at a surface region intended to interface with the surface region of another component. FIG. 2C shows exposure of two interfacing surface regions of two components to an energy field. The energy field excites the susceptor structures at the interfacing surface regions to produce heat that can thermally weld the two components.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

A feedstock for additive manufacturing is disclosed. The feedstock includes a matrix material and one or more susceptor structures that are dispersed in the matrix material. The one or more susceptor structures can be configured to be excited by an energy field. In some embodiments, the energy field is an electric field, a magnetic field, an electromagnetic field, or any combination thereof. In some embodiments, the one or more susceptor structures are microstructures. In some embodiments the one or more susceptor structures are nanostructures. In some embodiments, the one or more susceptor structures may be a mixture of microstructures and nanostructures. The size of the one or more susceptor structures may vary depending on the mode of excitation by the energy field. For example, induction heating may involve susceptor structures having an average diameter of about 10 nanometers to about 500 micrometers, dielectric heating may involve susceptor structures having an average diameter of about 10 nanometers to about 100 micrometers, and surface plasmon resonance heating may involve susceptor structures having an average diameter of about 10 nanometers to about 100 nanometers.

In some embodiments, the energy field is configured to penetrate the matrix material. The energy field can penetrate the matrix material to a depth sufficient to excite the one or more susceptor structures. For example, the depth of penetration can be about 10 micrometers to about 1 meter, depending on the strength of the energy field. In some embodiments, the one or more susceptor structures are sized and shaped to be compatible with the additive manufacturing process. For example, the susceptor structures may be sized and shaped to be compatible with the size of an extrusion nozzle, to maintain flowability of the feedstock during extrusion, and/or to enable dispersion of the susceptor structures in the matrix material.

In some embodiments, the one or more susceptor structures are configured to produce heat when excited by the energy field. The heat that is produced by the one or more susceptor structures can heat the surrounding matrix material, for example, to soften the surrounding matrix material for welding to another component, to anneal the surrounding matrix material, or to provide other forms of heat treatment.

In some embodiments, the one or more susceptor structures are configured to produce heat by electromagnetic induction heating. Suitable susceptor structures for electromagnetic induction heating can include those that are made of electrically conductive materials such as carbon fiber, metal fiber, carbon nanotubes, graphene flakes, or any combination thereof. The carbon fiber may be in the form of a woven carbon fiber fabric. The metal fiber may be in the form of a metal fiber fabric.

In some embodiments, the one or more susceptor structures are configured to produce heat by dielectric heating. Suitable susceptor structures for dielectric heating can include dielectric materials. In some embodiments, the one or more susceptor structures include graphite, magnetite, vanadium pentoxide, lead sulfide, zinc bromide, hematite, silicon carbide, or any combination thereof.

In some embodiments, the one or more susceptor structures are configured to produce heat by surface plasmon resonance heating. Suitable susceptor structures for surface plasmon resonance heating can include metallic nanoparticles. In some embodiments, the one or more susceptor structures include gold, silver, or any combination thereof.

The matrix material may include polymeric materials. In some embodiments, the matrix material includes a thermoplastic polymer, a thermosetting polymer, a photopolymer, or any combination thereof. In some embodiments, the thermoplastic polymer is polystyrene, polyvinyl chloride, polyphenylsulfone, acrylonitrile butadiene styrene (ABS), polyamide, polycarbonate, acrylonitrile styrene acrylate (ASA), or any combination thereof. In some embodiments, the thermosetting polymer is unsaturated polyester, epoxide, polyurethane, phenolic plastic, or any combination thereof. In some embodiments, the photopolymer is acrylate, methacrylate, epoxide, or any combination thereof.

Where the matrix material includes polymeric materials, polymerization initiators may be added to the matrix material to facilitate polymerization. In some embodiments, the matrix material further includes a photo polymerization initiator, a thermal polymerization initiator, or both. In some embodiments, the photo polymerization initiator is benzoyl peroxide, benzoin, azobisisobutyronitrile (AIBN), or any combination thereof. In some embodiments, the thermal polymerization initiator is lauroyl peroxide, (phenylazo) triphenylmethane, benzyl triphenylphosphonium salt, or any combination thereof.

Other than polymeric materials, the matrix material may alternatively include non-polymeric materials such as ceramics. In some embodiments, the matrix material includes a ceramic paste, ceramic slurry, or both.

The matrix material, including polymeric matrix materials and non-polymeric matrix materials, may further include one or more reinforcement materials. The reinforcement material may be in the form of particles, fibers, or any combination thereof. In some embodiments, the one or more reinforcement materials include metal, ceramic, polymers, or any combination thereof. In some embodiments, the one or more reinforcement materials include fibers that are made of metal, ceramic, polymer, or any combination thereof.

The feedstock as described herein can be formed into three-dimensional objects by additive manufacturing. In some embodiments, a method of making a three-dimensional object includes providing a feedstock that includes a matrix material, and one or more susceptor structures dispersed in the matrix material; disposing the feedstock in one or more layers to form a three dimensional object; and exposing the three-dimensional object to an energy field to excite the one or more susceptor structures, wherein the one or more susceptor structures produce heat when excited by the energy field, and at least a portion of the heat transfers to at least a portion of the matrix material. In some embodiments, the energy field is an electric field, a magnetic field, an electromagnetic field, or any combination thereof.

The one or more susceptor structures may be as described above, and may for example, include microstructures, nanostructures, or a mixture of microstructures and nanostructures.

The heat that is produced by the one or more susceptor structures and transferred to at least a portion of the matrix material, can provide heat treatment to the matrix material. In some embodiments, the heat produced by the one or more susceptor structures anneals the matrix material. In some embodiments, where the matrix material is a polymeric material and includes a thermal polymerization initiator, the heat produced by the one or more susceptor structures activates the thermal polymerization initiator to facilitate curing of the matrix material. In some embodiments, the heat produced by the one or more susceptor structures softens the matrix material for welding to another component.

In some embodiments, exposing the three-dimensional object to the energy field includes positioning energy field source relative to the three-dimensional object, wherein the energy field source is configured to generate and deliver the energy field to the one or more susceptor structures. The exposing of the three-dimensional object to energy field may include controlling one or more of power, frequency, and wavelength of the energy field.

The type of energy field, the material of the one or more susceptor structures, and/or the size of the one or more susceptor structures, may vary with the mode of excitation of the one or more susceptor structures. In some embodiments, the energy field causes induction heating of the one or more susceptor structures. Suitable susceptor structures for electromagnetic induction heating can include those as described above, such as carbon fiber, metal fiber, carbon nanotubes, graphene flakes, or any combination thereof. In some embodiments, the one or more susceptor structures have an average diameter of about 10 nanometers to about 500 micrometers. For example, the average diameter of the one or more susceptor structures can be about 10 nanometers, about 100 nanometers, about 500 nanometers, about 1 micrometer, about 10 micrometers, about 100 micrometers, about 200 micrometers, about 300 micrometers, about 400 micrometers, about 500 micrometers, or an average diameter between any of these values. In some embodiments, the energy field source is generated by one or more magnetic coils. Examples of magnetic coils include pancake coils, single-helical coils, double-helical coils, or any combination thereof.

In some embodiments, the energy field causes dielectric heating of the one or more susceptor structures. Suitable susceptor structures for dielectric heating can include dielectric materials as described above such as graphite, magnetite, vanadium pentoxide, lead sulfide, zinc bromide, hematite, silicon carbide, or any combination thereof. In some embodiments, the one or more susceptor structures have an average diameter of about 10 nanometers to about 100 micrometers. For example, the average diameter of the one or more susceptor structures can be about 10 nanometers, about 50 nanometers, about 100 nanometers, about 500 nanometers, about 1 micrometer, about 10 micrometers, about 50 micrometers, about 100 micrometers, or an average diameter between any of these values. In some embodiments, the energy field is generated by at least one microwave emitter. In some embodiments, the microwave emitter includes at least one magnetron.

In some embodiments, the energy field causes surface plasmon resonance heating of the one or more susceptor structures. Suitable susceptor structures for surface plasmon resonance heating can include metallic nanoparticles as described above such as gold, silver, or any combination thereof. In some embodiments, the one or more susceptor structures have an average diameter of about 10 nanometers to about 100 nanometers. For example, the average diameter of the one or more susceptor structures can be about 10 nanometers, about 20 nanometers, about 30 nanometers, about 40 nanometers, about 50 nanometers, about 60 nanometers, about 70 nanometers, about 80 nanometers, about 90 nanometers, about 100 nanometers, or an average diameter between any of these values. In some embodiments, the energy field is generated by at least one light source configured to produce surface plasmon excitation of the one or more susceptor structures. In some embodiments, the light source is a near-infrared (NIR) laser or a visible light lamp.

The matrix material may include polymeric materials as described above such as a thermoplastic polymer, a thermosetting polymer, a photopolymer, or any combination thereof. The matrix material may further include a photo polymerization initiator, a thermal polymerization initiator, or both. In some embodiments, the matrix material further includes a thermal polymerization initiator. In some embodiments, the heat produced by the one or more susceptor structures in the matrix material activates the thermal polymerization initiator. The thermal initiator, when activated, can facilitate curing of the matrix material. The thermal polymerization initiator may be lauroyl peroxide, (phenylazo)triphenylmethane, benzyl triphenylphosphonium salt, or any combination thereof.

The energy field may penetrate the three-dimensional object by a depth sufficient to excite the one or more susceptor structures. In some embodiments, the energy field penetrates the three-dimensional object by a depth of about 10 micrometers to about 1 meter. For example, the depth of penetration can be about 10 micrometers, about 100 micrometers, about 500 micrometers, about 1 millimeter, about 5 millimeters, about 1 centimeter, about 50 centimeters, about 1 meter, or a depth between any of these values.

The feedstock and the method of making a three-dimensional object as described above may suited for a variety of additive manufacturing processes. In some embodiments, the additive manufacturing process is an extrusion-based process, a powder-bed based process, or a liquid-based process. Extrusion-based processes may include: fused deposition modeling, multiphase jet solidification, and multi-jet modeling. Powder-bed based processes may include: three-dimensional printing, selective laser sintering, and selective mask sintering. Liquid-based processes may include stereolithography.

The heat produced by the one or more susceptor structures, when excited by the energy field, can be used to provide heat treatment to the matrix material or to the three-dimensional object. The matrix material or the three dimensional object may be uniformly exposed to the energy field or may have one or more selected portions exposed to the energy field. In some embodiments, a method of providing heat treatment to an additively formed three-dimensional object includes exposing at least a portion of the three-dimensional object to the energy field to excite the one or more susceptor structures, wherein the one or more susceptor structures within the exposed portion of the three-dimensional object produce heat when excited by the energy field, and at least a portion of the heat transfers to at least a portion of the matrix material. The transferred heat from the excited susceptor structures can provide heat treatment to at least a portion of the matrix material. Examples of the heat treatment include annealing and curing.

Instead of selectively exposing portions of the three-dimensional object to energy field, the three-dimensional object may have one or more portions with susceptor structures and one or more portions without the susceptor structures, such that exposure to the energy field can selectively heat treat the portions with the susceptor structures. In some embodiments, a method of providing heat treatment to an additively formed three-dimensional object includes exposing the entire three-dimensional object to the energy field, the three-dimensional object having at least one portion with one or more susceptor structures and at least another portion without any susceptor structures, wherein the one or more susceptor structures produce heat when excited by the energy field, and at least a portion of the heat transfers to at least a portion of the matrix material.

Methods of thermally welding components are also disclosed. The method includes: providing a first component comprising a first matrix material, and one or more first susceptor structures disposed in at least a first region of the first matrix material, wherein the one or more first susceptor structures are configured to be excited by an energy field; providing a second component comprising a second matrix material, the second matrix material having a second region; contacting the first region with the second region; and exposing at least the first region and the second region to the energy field to excite the one or more first susceptor structures in the first region, wherein the one or more first susceptor structures produce heat when excited by the energy field, and at least a portion of the heat transfers to at least a portion of the first matrix material to thermally weld the first component to the second component. In some embodiments, the energy field is an electric field, a magnetic field, an electromagnetic field, or any combination thereof.

In some embodiments, the one or more susceptor structures are microstructures. In some embodiments the one or more susceptor structures are nanostructures. In some embodiments, the one or more susceptor structures is a mixture of microstructures and nanostructures. In some embodiments, the second component further includes one or more second susceptor structures disposed in at least the second region of the second matrix material, the one or more second susceptor structures being configured to be excited by the energy field, and wherein the exposing to the energy field excites the one or more second susceptor structures in the second region to produce heat in the second matrix material to thermally weld the second component to the first component.

Three-dimensional objects are also disclosed. The three-dimensional object includes: a first component comprising a first matrix material, and one or more first susceptor structures disposed in at least a first region of the matrix material, wherein the one or more first susceptor structures are configured to be excited by an energy field. In some embodiments, the energy field is an electric field, a magnetic field, an electromagnetic field, or any combination thereof.

In some embodiments, the one or more susceptor structures are microstructures. In some embodiments, the one or more susceptor structures are nanostructures. In some embodiments, the one or more susceptor structures is a mixture of microstructures and nanostructures.

In some embodiments, the three-dimensional object includes a second component comprising a second matrix material, the second matrix material having a second region, wherein a joining interface of the first region and the second region is a thermally welded joint. In some embodiments, the second component further includes one or more second susceptor structures disposed in at least the second region of second the matrix material, wherein the one or more second susceptor structures are configured to be excited by the energy field.

FIGS. 1A to 1D show various stages in the process of making a three dimensional object in accordance with the present disclosure. FIG. 1A shows the deposition of layers of feedstock with susceptor structures 120 dispersed throughout matrix material 110, being extruded from an additive manufacturing nozzle 100. The feedstock can be deposited in one or more layers to form a three-dimensional object. FIG. 1B shows exposure of a portion of the three-dimensional object to an energy field 140. An energy field source 130 may be positioned over an area of the three-dimensional object. The energy field 140 excites the susceptor structures 150 in the exposed area to produce heat. The susceptor structures 120 that are not within the exposed area may not become excited, and hence do not generate heat. The heat produced by the susceptor structures 150 can provide heat treatment, for example, annealing, to the exposed portion of the matrix material 110. FIG. 1C shows exposure of additional areas of the three-dimensional object to an electromagnetic field. The darker areas of the matrix material 110 as shown in FIG. 1C depict portions of the matrix material 110 that have been treated by heat produced by the susceptor structures 150. As the energy field source 130 is scanned across the matrix material 110, the matrix material 110 is treated by heat produced from the susceptor structures 150 that are excited by the energy field 140. FIG. 1D shows the three-dimensional object after the exposure to the energy field is complete. In FIG. 1D, the energy field source 130 has scanned across the entire section of matrix material 110, and the entire three-dimensional object has undergone heat treatment. The heat treatment can improve material properties and mechanical properties of the resulting three-dimensional object.

FIGS. 2A to 2C show a three-dimensional object that has components to be assembled by thermal welding in accordance with the present disclosure. FIG. 2A shows the unassembled components 200 of three-dimensional object. FIG. 2B shows an expanded view of a portion of FIG. 2A. The expanded view shows each component having susceptor structures 220 at a surface region (of the matrix material 210) intended to interface with another surface region of another component. FIG. 2C shows exposure of two interfacing surface regions of two components to an energy field 250. The energy field 250 produced by the energy field source 240 can excite the susceptor structures 260 at the interfacing surface regions to produce heat that can thermally weld the two components. The heat produced can melt or partially melt the matrix material at the interfacing surface regions to form a thermally welded joint. The three-dimensional object 230 may be formed by joining all of the components in a similar manner.

Susceptor Structures

A dispersion of one or more susceptor structures can be provided in a matrix material prior to its use as a feedstock for an additive manufacturing process. Upon exposure to a specific type of energy field such as an electric field, a magnetic field, an electromagnetic field, or any combination thereof, the susceptor structures may rapidly heat to a high temperature, thus heat-treating the surrounding matrix material.

The particle size, material composition, and concentration of the susceptor structures in the matrix material can be designed to provide optimal heat treatment of the matrix material without interfering with the additive manufacturing process. The susceptor structures may be selected to be chemically inert to the matrix material and any other chemical compounds to which they may be exposed during the additive manufacturing process, for example, additives in the matrix material. The susceptor structures may be designed to react to a wavelength of the energy field to produce heat. The energy field can be capable of penetrating the matrix material at least to a depth where the susceptor structures are located. The depth of penetration can be, for example, about 10 micrometers to about 1 meter as described above. In some examples, the depth of penetration is about 10 centimeters. As the diameter of, or the volume fraction of, the susceptor structures in the matrix material increases, the processability of the feedstock may decrease. For example, where the feedstock contains too many susceptor structures or the susceptor structures are too large, the feedstock may not flow well enough to form uniform layers.

The one or more susceptor structures may be sized to be compatible with the mode of heating. The susceptor structures may produce heat by electromagnetic induction heating, dielectric heating, surface plasmon resonance, or any combination thereof. Depending on the mode of heating, the preferred size of the susceptor structures may vary. For instance, the size of the susceptor structures may be in the nanometer range or the micrometer range. Also, depending on the mode of heating, the material of the susceptor structures may also vary.

In some embodiments, the one or more susceptor structures produce heat by electromagnetic induction heating. Induction heating is the process of using a magnetic field to produce eddy currents within an electrically conductive medium, to raise the temperature of the medium via resistive heating. A number of materials may be used to take advantage of inductive heating. In some embodiments, the one or more susceptor structures may include carbon fiber, metal fiber, metal particles, carbon nanotubes, graphene flakes, or any combination thereof. The size of the susceptor structures may be in the nanometer range or the micrometer range where the mode of heating is by electromagnetic induction. In some embodiments, the one or more susceptor structures that produce heat by electromagnetic induction heating may have an average diameter of about 10 nanometers to about 100 micrometers, as described above. Induction heating works best when the susceptor structures make up a significant portion of the object's mass. For instance, a sample range of volume contents for the particle dispersion of susceptor structures is about 10 vol % to about 50 vol % of the total volume of the object.

In some embodiments, the one or more susceptor structures produce heat by dielectric heating. Dielectric heating is the production of heat when the electric dipoles of a dielectric material are rapidly switched by an oscillating electric field, such as a microwave or radio-frequency (RF) wave. There are a variety of materials that can produce heat by dielectric heating. In some embodiments, at least one of the one or more susceptor structures include graphite, magnetite ($Fe_3O_4$), vanadium pentoxide ($Va_2O_5$), lead sulphide (PbS), zinc bromide ($ZnBr_2$), hematite ($Fe_2O_3$), silicon carbide (SiC), or any combination thereof. The size of the susceptor structures may be in the nanometer range or the micrometer range where the mode of heating is by dielectric heating. In some embodiments, the one or more susceptor structures that produce heat by dielectric heating may have an average diameter of about 10 nanometers to about 100 micrometers as described above.

In some embodiments, the one or more susceptor structures produce heat by surface plasmon resonance. Surface plasmon resonance is a phenomenon that occurs when sub-optical particles are exposed to light. Certain frequencies of light cause free electrons in the particle to resonate, which in turn causes the particles to absorb and scatter that wavelength of light intensely. For example, susceptor structures formed of gold or silver that heat rapidly in response to visible light or near-infrared (NIR) radiation could be used. In some embodiments, the one or more susceptor structures may include gold, silver, or any combination thereof. As the susceptor structures are generally in the sub-optical range, suitable sizes are typically in the nanometer range where the mode of heating is by surface plasmon resonance. In some embodiments, the one or more susceptor structures that produce heat by surface plasmon resonance may have an average diameter of about 10 nm to about 100 nm as described above.

In some embodiments, the one or more susceptor structures are distributed throughout the entire matrix material of the three-dimensional object. In some embodiments, the one or more susceptor structures are selectively distributed at areas of the matrix material of the three-dimensional object, for example at areas where heat treatment is desired. In some embodiments, the one or more susceptor structures are provided in at least at a surface region of an additively manufactured component, wherein the surface region is configured to interface with another surface region of another additively manufactured component. In some embodiments, an additive manufacturing apparatus may be used to selectively distribute susceptor additive to specific portions of the manufactured object by alternately using portions of modified (for example, containing susceptor material) and unmodified feedstock during the fabrication process.

The energy field can be delivered to the susceptor structures at selected areas of the matrix material or an entire structure formed by the matrix material. The energy field can be provided by an energy field source that can irradiate selected areas of the matrix material or the entire structure formed by the matrix material.

In some embodiments, in addition to their heat treatment role, the one or more susceptor structures can be designed to directly contribute to the properties of the three dimensional object. Certain volume fractions of micro-size and nano-size additives may be incorporated into the matrix material of the feedstock to improve the mechanical, optical and thermal properties of the material. Reinforcement materials can also be added, in addition to the susceptor structures, to enhance properties of the three dimensional object. Any reinforcement material that has superior material properties can enhance the properties of a polymer matrix material when the two are mixed as a composite. Thus, the addition of metal or ceramic particle, fiber, wire, or mesh to the matrix material described herein can improve the matrix material's mechanical properties, since the reinforcement materials are generally be stronger than the base properties of the matrix material.

Matrix Material

The matrix material may be a polymeric material, a non-polymeric material, or both. In some examples, the polymeric materials may include a thermoplastic polymer, a thermosetting polymer, a photopolymer, or any combination thereof. In some examples, non-polymeric materials may include a ceramic paste, a ceramic slurry, or both.

In some embodiments, the matrix material includes a thermoplastic polymer. The thermoplastic polymer may be polystyrene, polyvinyl chloride, polyphenylsulfone, acrylonitrile butadiene styrene, polyamide, polycarbonate, acrylonitrile styrene acrylate (ASA), or any combination thereof. In some embodiments, the matrix material includes a thermosetting polymer. The thermosetting polymer may be unsaturated polyester, epoxide, polyurethane, phenolic plastic, or any combination thereof.

In some embodiments, the matrix material includes a photopolymer. Photopolymers are a class of thermosetting polymers that rely on light during the curing process instead of heat. Some examples of suitable photopolymers include epoxies, poly(vinyl ester), polyacrylate, or any combination thereof. A polymer, such as a thermosetting polymer, may be configured to photopolymerize, for example, by adding a photo polymerization initiator to the polymer.

The matrix material may additionally include one or more additives. Examples of additives include a photo polymerization initiator, a thermal polymerization initiator, a reinforcement material, a functionalization material, a material that will facilitate the manufacturing process by altering the properties of the feedstock, and any combination thereof. The additives may be provided in the matrix material together with the one or more susceptor structures. In some embodiments, the matrix material further includes a photo polymerization initiator. Some examples of suitable photo polymerization initiators include dilauroyl peroxide, 1-hydroxycyclohexyl phenyl ketone, dialkoxyacetophenones, α-hydroxyalkylphenones, α-aminoalkylphenones, O-acyl-α-oximinoketones, acylphosphineoxides, or any combination thereof. In some embodiments, the matrix material further includes a thermal polymerization initiator. The thermal polymerization initiator may react to heat produced by the susceptor structures and induce additional polymerization in the matrix material, which can strengthen the matrix material. Some examples of suitable thermal polymerization initiators include lauroyl peroxide, (phenylazo) triphenylmethane, benzyl triphenylphosphonium salts, or any combination thereof. In some embodiments, the matrix material further includes a reinforcement material. The reinforcement material may include particles of various sizes (including micro- and nanoparticles), fibers, whiskers, wires, and mesh. Some examples of suitable reinforcement materials include glass (particularly glass fibers such as fiberglass), steel, aramids (e.g., Kevlar), boron, silicon carbide, aluminum oxide, and any combination thereof. In some embodiments, the matrix material further includes a functionalization material. The matrix material can be functionalized in a wide variety of ways, including improving the optical, thermal, and/or electrical properties of the feedstock. Optical additives may include alumina, quartz, zircon, spinel, rutile, galena, barium titanate, and zirconia. Thermal and electrical additives include carbon (in various forms), copper, gold, silver, and aluminum. In some embodiments, the matrix material includes a material that will facilitate the manufacturing process by altering the properties of the feedstock. Some examples include plasticizers (which improve plasticity and flexibility), compatibilizers (which stabilize blends of two or more otherwise immiscible polymers), coupling agents (which form a bond between the polymer and any reinforcement structures that may be suspended within the feedstock), and solvents.

The matrix material may allow the energy field to penetrate at least to a depth where the one or more susceptor structures are located. In some embodiments, the energy field penetrates the matrix material to depth of at least about 10 micrometers. In some embodiments, the energy field penetrates the matrix material to depth of about 10 micrometers to about 1 meter. In some examples, energy field penetrates the matrix material to depth of about 10 centimeters.

The feedstock that contains the matrix material and susceptor structures may be fabricated into three dimensional objects using any one of a number of different additive manufacturing (AM) processes. AM processes that are compatible with the feedstock disclosed herein may include:

Fused Deposition Modeling (FDM), which is an extrusion-based method that involves depositing threads of molten material through a nozzle attached to a movable head;

Three-Dimensional Printing (3DP), in which an ink-jet printing head is used to spray liquid binder into a powder bed and bind the powder together layer-by-layer;

Selective Mask Sintering (SMS), a powder-based method that projects UV light through a mask to selectively melt an entire layer of polymer powder at once;

Stereolithography (SL), a liquid-based method that involves selectively curing a vat of photosensitive liquid resin into a solid form with an ultraviolet light source, using either a scanning UV beam or a masked UV lamp;

Multi-Jet Modeling (MJM), a liquid-based method that uses multiple nozzles to deposit UV-curable polymers and waxes, then exposes them to a UV lamp to cure them;

Jetted Photopolymer, a liquid-based process similar to MJM that uses wide-area inkjets to deposit layers of photopolymers on a substrate; and Multiphase Jet Solidification (MJS), an extrusion-based AM process similar to fused deposition modeling.

Energy Field Source

The energy field source may be any device that emits an energy field such as an electric field, a magnetic field, an electromagnetic field, or any combination thereof, which excites the susceptor structures within the matrix material. When excited, the susceptor structures produce heat to provide heat treatment to proximate areas of the three dimensional object or matrix material.

The power, wavelength, and resolution of the energy field can be dependent on the geometry and material characteristics of the three dimensional object. The size and precision of the energy field source can be determined by both the scale of the object and the distribution of the susceptor structures in the matrix material. For example, where the susceptor structures are uniformly mixed into the matrix material of the object, the energy field source can be designed to emit a narrow energy field with sufficient resolution to selectively cure the smallest features of the object. Where the susceptor structures are only present in selected portions of the matrix material of the object, the energy field source need not be very precise, and may be designed such that the entire object is exposed to the energy field at once. The wavelength of the energy field can be designed to excite the susceptor structures and to penetrate the matrix material to a reasonable depth. In order to prevent overheating of the susceptor structures and surrounding matrix material, the power level and frequency of the energy field source may be carefully monitored during the heat treatment. The matrix material may undergo irreversible degradation and damage when exposed to very high temperatures.

The design of the energy field source may be determined by the mechanism to which the susceptor structures are excited and heated. A wide variety of magnetic coils are available for the production of the magnetic fields that drive induction heating. Common coil geometries include pancake coils, single- and double-helical coils. Customized coils may also be produced to accommodate specific object geometries. The frequency and power level of the energy field used to accomplish dielectric heating may be highly sensitive to the type and quantity of material being heated. Microwave emitters, such as magnetrons, are a common device used to produce these fields. Surface plasmon resonance may be accomplished using any device that produces the correct wavelength of light, such as a near infrared (NIR) laser or visible light lamp.

System Performance

The disclosed embodiments may fully or partially overcome material deficiencies of objects formed by additive manufacturing. Since most additive manufacturing processes finish one entire horizontal layer of the object before beginning production of the next layer, there is little opportunity for strong bonding to occur between the stacked layers. Also, many additive manufacturing processes produce small voids within the object during fabrication, including fused deposition modeling, which creates gaps between deposited threads, and three-dimensional printing, which leaves unfilled gaps in the powder layers. The unfilled gaps and poor inter-layer bonding are among the factors that contribute to seriously compromising the mechanical integrity of the three-dimensional object. For instance, the modulus of elasticity for parts produced with fused deposition modelling (FDM) is nearly 20% lower in the longitudinal direction (for example, along the axis of the deposited fibers) than in the bulk material, and can be dramatically worse in transverse loading. Compounding this reduction in mechanical capability is the fact that the orientation of the fabricated material layers rarely aligns with the intended load direction of the part, especially in parts that are geometrically complex. In short, additive manufacturing has a number of distinct mechanical drawbacks.

Heat treating and annealing additively manufactured objects can be one method for addressing their mechanical shortcomings. For example, annealing thermoplastic parts has been shown to improve the bonding between material layers and shrink any voids that may be present. This greatly reduces the anisotropy induced in the object by the AM process as well. For instance, annealing ABS parts made with FDM yields a 38% increase in their transverse strength. Heat treatments may also be used to improve the curing of thermosetting resins, or any polymer that contains thermal polymerization initiators. This is particularly useful in the case of photopolymer-matrix composites. Since certain reinforcement materials, such as carbon fibers, are opaque to ultraviolet light, it becomes very difficult to completely cure the composite. This may be remedied by the activation of thermal polymerization initiators as a second curing process. Finally, heat treatments may be used to increase the percent crystallinity of semi-crystalline polymers, which leads to improvements to the stiffness and fracture toughness of the material.

The disclosed embodiments have a number of unique benefits and advantages over conventional heat treatments. When excited, the susceptor structures heat the entire targeted volume of the manufactured object evenly, which grants precise control over the temperature gradient and overall temperature within the object. This, in turn, helps prevent the negative side effects associated with conventional annealing, such as extensive part distortion and thermal degradation at the part surface. The heating provided by the susceptor structures in the matrix material has a greater degree of precision than conventional induction- and microwave-based heating techniques since the susceptor structures may be limited to only desired locations in the object. The feedstock and methods of making three dimensional objects using the feedstock as disclosed herein require minimal effort to implement, as they take advantage of established additive manufacturing processes and heat treatment techniques.

EXAMPLES

Example 1: Thermoplastic Annealing Via Spatially-Selective Dielectric Heating

The present example describes annealing an additively manufactured thermoplastic object with a uniformly dispersed susceptor structures through the selective application of microwaves.

A mixture of 75 vol % nylon (polyamide) and 25 vol % magnetite susceptor structures is fabricated into a three-dimensional object using selective laser sintering. The magnetite susceptor structures have diameters of approximately 20 µm and are uniformly dispersed throughout the nylon matrix material.

Once the three-dimensional object has been fabricated, at least a portion of the three-dimensional part is exposed to a microwave beam, which causes the susceptor structures to become excited and produce heat. At least a portion of the heat produced by the excited susceptor structures transfers to the surrounding matrix material, which both closes any voids in the material that were left during the manufacturing process and relaxes any internal stresses that may be present in the matrix material. The microwave beam is trained upon the portion of the additively manufactured object until the matrix material is completely annealed, at which point the excitation of the susceptor structures is ceased.

This example teaches that the material properties of an additively manufactured object can be improved through annealing via dielectric heating by the selective application of microwaves.

Example 2: Dual Curing of a Photopolymer-Matrix Composite Via Spatially Selective Induction Heating The present example describes using a thermal polymerization initiator and induction heating to ensure complete curing of a photopolymer-matrix composite.

A mixture of 75 vol % acrylate photopolymer and 25 vol % chopped carbon fibers is fabricated using stereolithography. The carbon fibers are 7 µm in diameter and are uniformly dispersed throughout the acrylate photopolymer matrix material. Lauroyl peroxide is uniformly dispersed throughout the matrix material in an amount sufficient to enable thermal curing of the polymer when exposed to heat.

Carbon is generally opaque to UV radiation, so the inclusion of the carbon fibers causes incomplete curing of the polymer matrix during the manufacturing process. To remedy the incomplete curing, a rapidly oscillating magnetic field is selectively applied to discrete sections of the manufactured object, one at a time, using an industrial electromagnet, which causes the dispersed carbon fibers to heat via induction heating. The heat generated by the carbon fibers enables the acrylate photopolymer to cure completely. Once the acrylate photopolymer has cured completely, the magnetic field is switched off.

This example teaches that otherwise-incurable sections of a photopolymer matrix composite can be cured with dual curing by using a thermal polymerization initiator and inductive heating.

Example 3: Thermoplastic Welding Via Spatially-Selective Induction Heating

The present example describes welding multiple simple parts together with induction heating to produce a complicated final product.

A mixture of 80 vol % polycarbonate and 20 vol % nickel microparticles is fabricated using a fused deposition modeling system. The nickel microparticles have diameters of approximately 20 µm and are uniformly dispersed throughout the polycarbonate matrix material. Nickel was selected for the material of the microparticles because the Curie temperature of nickel (358° C.), that is, the temperature at which it loses its magnetic properties, is not close to the melting temperature of polycarbonate (about 155° C.). This means that it can be used to heat the polycarbonate matrix material to the temperature required for thermoplastic welding with no risk of demagnetizing (and thus rendering useless) the nickel microparticles in the process. The electromagnetic field source excites the microparticles with a magnetic field with a strength and frequency of 160 Oe (oersteds) and 2.25 MHz (megahertz), respectively.

Once the parts have all been printed, the bonding regions of each part, which contain microparticles, are placed in contact with one another and exposed to a magnetic field. This causes the polycarbonate at each bonding region to soften, and eventually melt, as the temperature of the excited microparticles approaches 155° C. Finally, the magnetic excitation is halted and the adjacent parts are pressed into one another and cooled until the now-molten polycarbonate in the bonding regions reconsolidates, which forms a strong mechanical bond between the two welded components.

This example teaches that a complicated final product can be assembled through welding of multiple simple parts using induction heating.

Example 4: Thermoplastic Welding Via Spatially-Selective Dielectric Heating and Selective Dispersion of Susceptor Structures The present example describes welding multiple simple parts together with dielectric heating and selectively dispersed susceptor structures to produce a complicated final product.

A mixture of 80 vol % polyphenylsulfone and 20 vol % graphite nanoparticles is fabricated using a fused deposition modeling system. The graphite nanoparticles have diameters of approximately 20 μm and are selectively dispersed throughout the polyphenylsulfone matrix material via a separate feeding system. The additive manufacturing apparatus alternates between printing two feedstocks: one of unmodified polyphenylsulfone, and one of polyphenylsulfone mixed with graphite nanoparticles. The bulk of the manufactured object includes unmodified polyphenylsulfone. However, at designated weld points, the additive manufacturing apparatus prints the polyphenylsulfone mixed with graphite nanostructures. Since only the weld points on the object contain the graphite nanostructures, only those regions of the object will heat when the entire object is exposed to the oscillating magnetic field. The molten polyphenylsulfone on the first component will reconsolidate with the molten polyphenylsulfone on a second component, forming a strong mechanical bond between the two components.

Upon fabrication, the entire manufactured object is subjected to a large-scale microwave beam, which only heat-treats the segments of the part that contain the graphite nanostructures. This causes the polyphenylsulfone surrounding the selectively dispersed nanostructures to soften, and eventually melt, as the temperature of the excited nanostructures approaches 245° C. The electromagnetic excitation is halted and the bonding regions of each part, which contain nanostructures, are placed in contact with one another and the adjacent parts are pressed into one another and cooled until the now-molten polyphenylsulfone in the bonding regions reconsolidates, forming a strong mechanical bond between the two welded components.

This example teaches that a complicated final product can be assembled through welding of multiple simple parts using dielectric heating and selectively dispersed nanostructures.

Example 5: Thermoplastic Welding Via Spatially-Selective Dielectric Heating

The present example describes welding multiple simple parts together with dielectric heating to produce a complicated final product.

A mixture of 80 vol % acrylonitrile butadiene styrene (ABS) powder and 20 vol % magnetite nanoparticles is fabricated using selective laser sintering. The magnetite nanoparticles have a diameter of approximately 10 nanometers and are uniformly dispersed throughout the ABS matrix material.

Once the parts have all been fabricated, the bonding regions of each part, which contain nanoparticles, are placed in contact with one another and exposed to a microwave beam, which causes the nanoparticles to become excited and produce heat. At least a portion of the heat produced by the excited nanoparticles transfers to the surrounding matrix material, which causes the ABS at each bonding region to soften, and eventually melt, as the temperature of the excited nanoparticles approaches 270° C. Finally, the electromagnetic excitation is halted and the adjacent parts are pressed into one another and cooled until the now-molten ABS in the bonding regions reconsolidates, which forms a strong mechanical bond between the two welded components.

This example teaches that a complicated final product can be assembled through welding of multiple simple parts using dielectric heating.

Example 6: Thermoplastic Welding Via Spatially-Selective Surface Plasmon Resonance The present example describes welding multiple simple parts together with surface plasmon resonance to produce a complicated final product.

A mixture of 80 vol % acrylonitrile styrene acrylate (ASA) and 20 vol % gold nanorods is fabricated using inkjet printing. The gold nanorods have a length of 50 nm and an aspect ratio of approximately 4 and are uniformly dispersed throughout the ASA matrix material.

Once the parts have all been printed, the bonding regions of each part, which contain nanorods, are placed in contact with one another and exposed to near-infrared (NIR) radiation. This causes the ASA at each bonding region to soften, and eventually melt, as the temperature of the excited nanorods approaches 265° C. Finally, the electromagnetic excitation is halted and the adjacent parts are pressed into one another and cooled until the now-molten ASA in the bonding regions reconsolidates, which forms a strong mechanical bond between the two welded components.

This example teaches that a complicated final product can be assembled through welding of multiple simple parts using surface plasmon resonance.

Example 7: Accelerated Curing of Concrete Via Spatially-Selective Induction Heating The present example describes an accelerated curing process for printed concrete structures through the use of induction heating.

A mixture of 80 vol % concrete and 20 vol % carbon fiber mesh is fabricated using concrete printing. The carbon fiber mesh is uniformly dispersed throughout the concrete matrix material. A rapidly oscillating magnetic field is applied to at least a portion of the concrete object, which causes the carbon fiber mesh to heat via inductive heating. The heat from the carbon fiber mesh induces accelerated curing of the concrete object only in the region that is exposed to the oscillating magnetic field. After the first portion of the concrete is cured with the magnetic field, the oscillating magnetic field may be moved and used to cure another section of the printed concrete structure.

This example teaches that printed concrete structures can be rapidly cured using induction heating.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," and so on). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, and so on" is used, in general, such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, and so on). In those instances where a convention analogous to "at least one of A, B, or C, and so on" is used, in general, such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, and so on). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, and so on. As a non-limiting example, each range discussed herein can be readily broken down into a lower third, middle third and upper third, and so on. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A feedstock system for additive manufacturing, the feedstock system comprising:
   a first feedstock, comprising:
      a first matrix material; and
      one or more first susceptor structures selectively dispersed in a first portion of the first matrix material, wherein the first matrix material comprises at least one second portion, different from the first portion, without the one or more first susceptor structures; and
   a second feedstock, different from the first feedstock, comprising:
      a second matrix material; and
      one or more second susceptor structures selectively dispersed in a third portion of the second matrix material, wherein the second matrix material comprises at least one fourth portion, different from the third portion, without the one or more second susceptor structures,
      wherein the one or more first and second susceptor structures are configured to be excited when exposed to an energy field, and
      wherein the first or second matrix material further comprises a photo polymerization initiator, a thermal polymerization initiator, or both.

2. The feedstock system of claim 1, wherein the energy field is an electric field, a magnetic field, an electromagnetic field, or any combination thereof.

3. The feedstock system of claim 1, wherein the one or more first and second susceptor structures are configured to produce heat when excited by the energy field.

4. The feedstock system of claim 1, wherein the one or more first and second susceptor structures are configured to produce heat by electromagnetic induction heating, dielectric heating, or surface plasmon resonance heating.

5. The feedstock system of claim 1, wherein the first or second matrix material comprises a thermoplastic polymer, a thermosetting polymer, a photopolymer, or any combination thereof.

6. A method of making a three-dimensional object, the method comprising:
    providing a first feedstock comprising a first matrix material, and one or more first susceptor structures dispersed in the first matrix material;
    providing a second feedstock, different from the first feedstock, comprising a second matrix material, and one or more second susceptor structures dispersed in the second matrix material;
    disposing the first and second feedstocks in two or more layers to form the three-dimensional object; and
    exposing the three-dimensional object to an energy field to excite the one or more first and second susceptor structures, wherein the one or more first and second susceptor structures produce heat when excited by the energy field, and wherein at least a portion of the heat transfers to at least a portion of the first and second matrix materials,
    wherein the first or second matrix material further comprises a photo polymerization initiator, a thermal polymerization initiator, or both.

7. The method of claim 6, wherein the energy field is an electric field, a magnetic field, an electromagnetic field, or any combination thereof.

8. The method of claim 6, wherein the heat produced by the one or more first and second susceptor structures anneals the first and second matrix materials.

9. The method of claim 6, wherein exposing the three-dimensional object to the energy field comprises positioning an energy field source relative to the three-dimensional object, and wherein the energy field source is configured to generate and deliver the energy field to the one or more first and second susceptor structures.

10. The method of claim 6, wherein the energy field causes induction heating of the one or more first and second susceptor structures, and wherein the one or more first and second susceptor structures have an average diameter of about 10 nanometers to about 500 micrometers.

11. The method of claim 6, wherein the first or second matrix material comprises a thermoplastic polymer, a thermosetting polymer, a photopolymer, or any combination thereof.

12. A method of making a three-dimensional object, the method comprising:
    providing a first feedstock comprising a first matrix material, and one or more first susceptor structures dispersed in the first matrix material;
    providing a second feedstock, different from the first feedstock, comprising a second matrix material, and one or more second susceptor structures dispersed in the second matrix material;
    disposing the first and second feedstocks in two or more layers to form the three-dimensional object; and
    exposing the three-dimensional object to an energy field to excite the one or more first and second susceptor structures, wherein the one or more first and second susceptor structures produce heat when excited by the energy field, wherein at least a portion of the heat transfers to at least a portion of the first and second matrix materials,
    wherein the first or second matrix material further comprises a thermal polymerization initiator, and wherein the heat produced by the one or more first and second susceptor structures activates the thermal polymerization initiator.

13. A three-dimensional object, comprising:
    a first component comprising a first matrix material, and one or more first susceptor structures selectively disposed in at least one first region of the first matrix material, wherein the first matrix material comprises at least a second region, different from the at least one first region, without the one or more first susceptor structures, wherein the one or more first susceptor structures are configured to be excited by an energy field, and wherein the first matrix material further comprises a photo polymerization initiator, a thermal polymerization initiator, or both.

14. The three-dimensional object of claim 13, wherein the energy field is an electric field, a magnetic field, an electromagnetic field, or any combination thereof.

15. The three-dimensional object of claim 13, further comprising a second component, different from the first component, comprising a second matrix material, the second matrix material having a third region, wherein a joining interface of the at least one first region and the third region is a thermally welded joint.

16. The three-dimensional object of claim 15, wherein the second component further comprises one or more second susceptor structures disposed in the third region of the second matrix material, wherein the second matrix material comprises at least a fourth region, different from the third region, without the one or more second susceptor structures, and wherein the one or more second susceptor structures are configured to be excited by the energy field.

* * * * *